Aug. 23, 1960  A. WÖGERBAUER  2,950,376
METHOD AND APPARATUS FOR THE MANUFACTURE OF SECTIONS
Filed March 26, 1958  7 Sheets-Sheet 1

INVENTOR
ALFRED WÖGERBAUER
BY
HIS ATTORNEYS

Aug. 23, 1960 A. WÖGERBAUER 2,950,376
METHOD AND APPARATUS FOR THE MANUFACTURE OF SECTIONS
Filed March 26, 1958 7 Sheets-Sheet 2

INVENTOR
ALFRED WÖGERBAUER
BY
HIS ATTORNEYS

Aug. 23, 1960   A. WÖGERBAUER   2,950,376
METHOD AND APPARATUS FOR THE MANUFACTURE OF SECTIONS
Filed March 26, 1958   7 Sheets-Sheet 4

INVENTOR
ALFRED WÖGERBAUER
BY
HIS ATTORNEYS

Aug. 23, 1960   A. WÖGERBAUER   2,950,376
METHOD AND APPARATUS FOR THE MANUFACTURE OF SECTIONS
Filed March 26, 1958   7 Sheets-Sheet 5

INVENTOR
ALFRED WÖGERBAUER
BY
HIS ATTORNEYS

Aug. 23, 1960 A. WÖGERBAUER 2,950,376
METHOD AND APPARATUS FOR THE MANUFACTURE OF SECTIONS
Filed March 26, 1958 7 Sheets-Sheet 6

INVENTOR
ALFRED WÖGERBAUER
BY
HIS ATTORNEYS

United States Patent Office

2,950,376
Patented Aug. 23, 1960

---

2,950,376

METHOD AND APPARATUS FOR THE MANUFACTURE OF SECTIONS

Alfred Wögerbauer, 9 Greilstrasse, Linz, Austria

Filed Mar. 26, 1958, Ser. No. 724,060

Claims priority, application Austria Apr. 5, 1957

15 Claims. (Cl. 219—67)

This invention relates to a method for the manufacture of sections, particularly of tubes and hollow sections, in which two or more metal strips or skelps are shaped to form component sections, which are then welded together to form the desired shape of section. The invention relates also to apparatus for carrying out the method.

It is already known to make tubes by resistance welding from two semicircular trough sections. The two semicircular sections were welded together in a relative position in which two welding seams were disposed vertically over each other. In order to enable a continuous operation a separate device was required for giving each of the two strips in the shape of a component section. Such a plant comprised, e.g., two separate special shape-rolling machines having vertical shafts, which must be synchronized with each other. Separate tool sets (shaping rolls, electrode rollers etc.) were required for each tube cross-section. A change of program required considerable conversion times for the replacement of tools. For this reason the manufacture of small quantities was uneconomical and the degree of utilization of such a plant was low.

It is an object of the invention to provide a continuous method for the manufacture of sections, particularly of tubes or hollow sections, and the corresponding apparatus, in order to avoid the said disadvantages. According to the invention it is particularly desired to reduce the plant and tool costs and to avoid periods of standstill.

This object of the invention is primarily achieved in that two or more metal strips are moved in several lines one beside the other in a common plane and are progressively shaped to component sections, at least one of which is progressively twisted out of its plane of support and moved to a position in which the edges of the component sections face each other to provide for the desired section, whereafter the edges are joined by two or more welding seams, which is followed by an additional shaping operation, if desired. Drawing machines or shape-rolling machines may be used as means for shaping the metal strips to form component sections. Different from the known procedure the invention provides that all component sections which are welded together to form the desired section are shaped on the same shaping train or roll train. Compared to the former procedure each roll stand of the roll train has two punch rolls and two die rolls so that only half the number of roll stands is required. Only at the end of the shaping train or roll train the component sections which are moved parallel to each other and one beside the other in a common plane are twisted relative to each other so that the edges to be welded are moved together. In order to minimize the stresses which may be set up in that phase the twisting device is not arranged directly behind the means for shaping the component sections but at an appropriate distance behind said means.

The invention may be used to advantage for the manufacture of hollow sections, such as round tubes, rectangular tubes, triangular tubes, hexagonal tubes and the like, as well as for the manufacture of open sections, such as cruciform sections. In the manufacture of round tubes and rectangular tubes both of the component trough or angle sections are generally twisted, one in the clockwise and one in the counterclockwise sense, until their free end edges face each other for being welded. The invention is not, however, restricted to this practice. As will become apparent from the subsequent description it is not necessary to twist all component sections before they are welded. It is sufficient to twist at least one of the component sections in such a manner as to move the welding edges of the component sections together. The welding edges need not consist of free end edges of the component sections. In the manufacture of cruciform sections from angle-shaped component sections the invention may be carried out by moving the edges formed by the flanging operation together back to back and to connect them by a welding seam.

One of the most important and preferred applications of the invention resides in the manufacture of round tubes of any desired diameter from strips shaped to form troughlike component sections. In that embodiment of the invention the strips are given a cross-sectional shape which consists of two quadrant arcs with an intermediate flat portion of selectable length. At the end of the shaping train these components are twisted out of their plane of support towards each other through 90° each so that their edges face each other and are then connected by two welding seams to form a flat oval tube, which is then shaped to form a round tube. This embodiment of the invention has important advantages over the known method of making round tubes. To make tubes of different diameter it was previously necessary to make semicircular component sections having different radii of curvature. In the case of a change from a tube larger in diameter to a tube smaller in diameter or vice versa all punch and die rolls of the shaping train for the component sections had to be replaced. This involved a large inventory of tool sets, high labour costs and considerable periods of standstill. As contrasted therewith the invention enables the manufacture of all tube cross-sections with the same quadrant-section shaping tools because only the flat section between these two quadrant-shaped tools is to be replaced, which involves much lower work and cost. The tubes smallest in diameter which can be made in this way will be obtained if the flat intermediate part is omitted. The diameter of such tube will be $2r$, if $r$ is the radius of the quadrant-section portions. The tubes largest in diameter which can be made in this way will be obtained if the longest flat intermediate parts are used which can still be accommodated on the shaft between the quadrant-section tool parts. If $l$ is the length of the flat intermediate parts and $r$ the radius of the quadrant-section tool parts the diameter of the tube to be made will be $$2r + \frac{2l}{\pi}$$

The shaping of a flat oval tube made with the aid of flat intermediate parts to form a round tube may be effected behind the welding machine with the aid of a suitable shaping device, e.g., with a multiple-roll shaping machine. This shaping to a round tube may be performed at any desired time. In some cases it is preferable to stack or ship the flat oval tubes as such, because in this condition they occupy less space, and to effect the shaping to a round tube only before the final use, e.g., on the building site.

The method which has been described for the manufacture of round tubes may be applied without substantial changes also to rectangular tubes, hexagonal tubes and similar cross-sections. In the manufacture of rectangular tubes channel-shaped component sections for rectangles of different cross-sections may be shaped with the same tools, e.g., shaping rolls, if the spacing of said tools on the shafts of the shaping machines is appropriately adjusted. Cylindrical intermediate rolls may be arranged between the shaping rolls. To mount such intermediate rolls on the shaft it is necessary in general to remove the outer housings of the shaping roll stand and all preceding rolls. In order to avoid this a special embodiment of the invention, which will be described more fully hereinafter, provides bipartite intermediate rolls, which are mounted, e.g., with the aid of a cone between the actual shaping rolls and are held by the latter. In the case of a conversion to another size the housings of the shaping machine may remain in position and only the tool fixing means must be loosened and retightened.

When it is desired to make tubes having a square or approximately square section according to the present invention they may be considered rectangles and be made according to the method described hereinbefore. Another embodiment of the invention, however, provides for the manufacture of square tubes by welding two angle sections together. In this case two angles shaped one beside the other are twisted through 90° towards each other, moved together at their free edges and then welded together at the edges. This process may be used for making square tubes of various sizes without requiring substantial alterations regarding the tools, e.g. the rolls for shaping the component sections. After the square tubes have been welded they may be given close dimensional tolerances by sizing tools (drawing dies, shaping rolls), which must only be adjusted but need not be replaced in the case of a change of program. Thus, all square tubes within the capacity of the plant may be made with one universal tool set. In the case of square tubes having relatively sharp corners (corner radius less than twice the wall thickness) the invention provides for preparing the angle-shaped component sections for welding only by chamfering the edges (by rolling or planing). In the manufacture of square tubes having more gently rounded edges the edges of the flat starting strip may be bent by about 45° before the angles are shaped. Whereas in the former case two corner joints connect the component sections to form a square tube the connection is made in the second case by butt joints.

Another embodiment of the invention provides for the manufacture of triangular tubes from three strips. In this embodiment the edges of three strips are upwardly bent through about 60°. Whereas the intermediate strip is moved through the plant without being twisted the two outer strips are twisted through 120° towards each other so that pairs of edges of the component sections face each other. If the welding is performed by resistance welding it is either possible to provide three welding transformers each of which is fed by one phase of the three-phase alternating current supply or three welding joints may be connected in parallel to the same alternating current phase.

The welding may be performed according to any desired method. The conductive and inductive variants of the electric notch effect welding have proved particularly suitable. Methods of this type have been described, e.g., in my Austrian patent specifications No. 169,611 and No. 169,915 and in my U.S. patent specification No. 2,647,981. This process is suitable for welding any desired metal materials, such as plain and alloyed steels, chrome steels, aluminium and magnesium alloys, titanium, copper and others.

In a special embodiment of the invention steps are taken to ensure that the various welding seams provided to form the desired profile are equivalent to each other. To this end the electrode rollers used in conductive notch effect welding may be pivotally arranged according to the invention. For instance, if the upper seam is cooler than the lower one the electrode rollers are swung to reduce their spacing on the upper side. Thus the electric resistance of the upper welding joint is reduced (shorter notch) and the current and the welding temperature increase. The electrode may be swung by a mechanism which is operated by the welder or automatically.

Embodiments for carrying out the process according to the invention and of apparatus therefor are illustrated more fully and by way of example in the drawing.

Fig. 10 shows also six typical cross-sections obtained during the manufacture of a triangular tube according to another embodiment of the method. Fig. 12 is a diagrammatic vertical sectional view of a shaping apparatus, taken along line XII—XII of Fig. 2a. Figs. 13a and 13b show a split intermediate roll in elevation and in section, respectively.

In the example shown in Figs. 1a, 1b and 2a, 2b the starting material for the continuous manufacture of round tubes consists of two steel strips, which should be as long as possible and are wound up to form coils 1 and 2 arranged at the head end of the plant. With the aid of a butt-welding device 3 the rear ends of the used-up coils are welded to the front ends of the following new coils so that endless strips are obtained, which are fed to the plant, e.g., by way of a loop, not shown. The intermittently operating set of driving rollers 4 serves for deflecting the strips and for forming the loops. The roller set 5 deflects the strips again and feeds them continuously to the rest of the plant. A double roller 6, which can be adjusted to upper and lower positions, may be used to cause the strips to relax. In the case of scaled, hot-rolled strips the scale which has been loosened by the rollers 4, 5 and 6 may be removed in a cleaning device 7, e.g. by brushes. In the roll pairs 8/9, 10/11, 12/13 and 14/15, which are arranged one behind the other to form the shaping train the strips are progressively shaped in stages to form the half-shells 16 and 17. Drawing dies or the like may be used instead of the shaping rolls but in that case steps must be taken for feeding the strips, e.g., by means of feed rolls.

After having passed through the shaping means the component sections moving parallel one beside the other are twisted by 90° each. This is the most important feature of the invention. The right-hand component section 16 is turned in the counterclockwise sense, the left-hand component section 17 is turned in the clockwise sense, and both component sections are converged so that the previously outer and previously inner edges of the component sections face each other. Then the two seams are progressively welded at the same time. As has already been mentioned, various welding methods are suitable for this purpose. Oxyacetylene gas welding, electric arc welding, electric resistance welding (Johnston method) or other welding methods may be employed.

In the illustrated embodiment the welding is effected according to the conductive variant of the electrical notch effect welding method. The inductive variant of that method could also be employed. These two variants are diagrammatically illustrated in Figs. 15 and 16. The principle resides in that the electric current is conductively or inductively supplied so that the current must flow around the notch formed between the parts to be connected to give such a high concentration of current as to cause the heating required to fuse the metal. As has already been mentioned, this welding method has been described more fully in my said prior patents. This welding method has proved particularly advantageous for the method according to the invention. In the example shown in Figs. 1a, 1b and 2a, 2b the component sections which have been twisted are passed through two roll pairs 18/19 and 20/21. These are transversely adjustable, as is indicated by the double arrows. The inner rolls 19 and 20 act as spreading rolls and urge jointly with the longitudinally adjustable mandrel 22 the component sections 16 and 17 into contact with the welding current rollers 23 and 24. The edges of the component sections meet and are welded at 25. The two welding current rollers are supplied from a source of current (not shown) with low-voltage electric current of high current value, which must flow from one roller to the other by way of the two points where the two component sections are to be welded. Owing to the notch effect the current causes a high concentration of current and corresponding temperature rise at said points. Pressure rollers 26 and 27 (Fig. 1b) are arranged behind the tips of the welding seam in order to avoid the edges from sliding along each other (offsetting) and to shape the welding seam while warm. The outer welding burr is then removed by two cutting tools 28 and 29. The welding seams may be treated in a similar manner on the inside. Compared to the arrangement for single-seam tubes the arrangement according to the invention has decisive advantages owing to optimum accessibility and short lever arms.

A heat-treating device 30 is associated with the welding device. The heat-treating device may consist of a cooling device or a reheating device. The heat-treating device may also remain unused.

The tube leaves the welding device as a flat oval tube placed on edge, which is shaped in stages to form a round tube by the roll pairs 31/32, 33/34, 35/36 and is sized with the aid of the four rolls 37–40 lying in one plane.

The shaping of the flat oval tubes to form round tubes may also be effected by other processes, such as drawing or expanding. In the case of large distances from the place of manufacture to the place of use the improved stacking properties of the flat oval tubes and the reduced shipping shape required by them may be utilized and the final shaping may be effected close to the place of final use.

A cutting device moving with the tube for cutting the same to length may be arranged behind the plant shown.

Figure 1A:
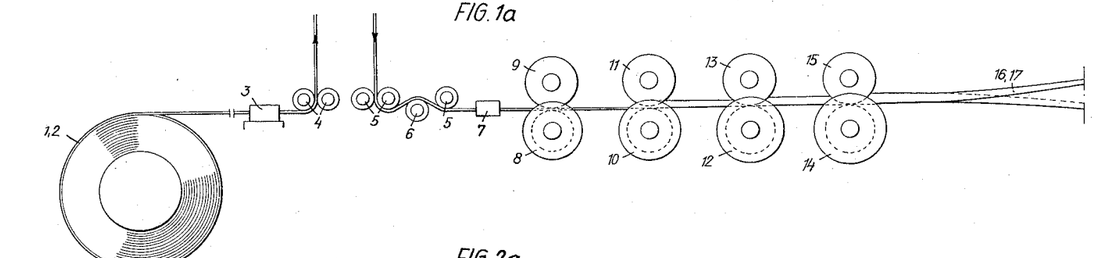
Figs. 1a and 1b are diagrammatic supplementary views of a plant, which serves for making round tubes, shown in elevation.
Figure 1B:
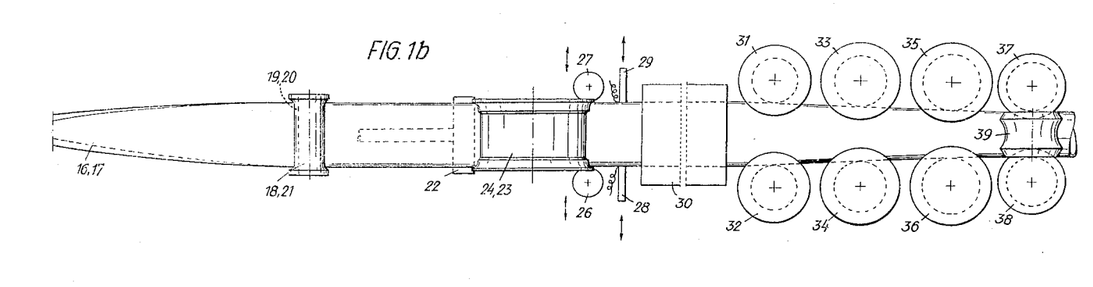
Figure 2A:
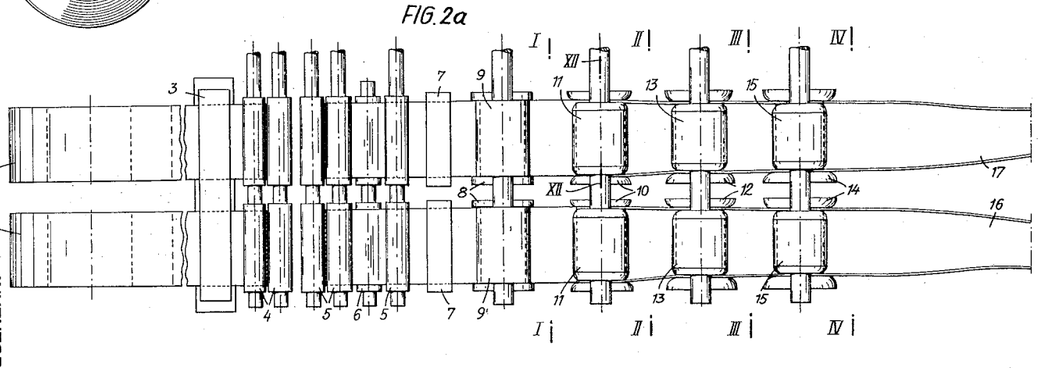
Figs. 2a and 2b are supplementary top plan views of the same plant.
Figure 2B:
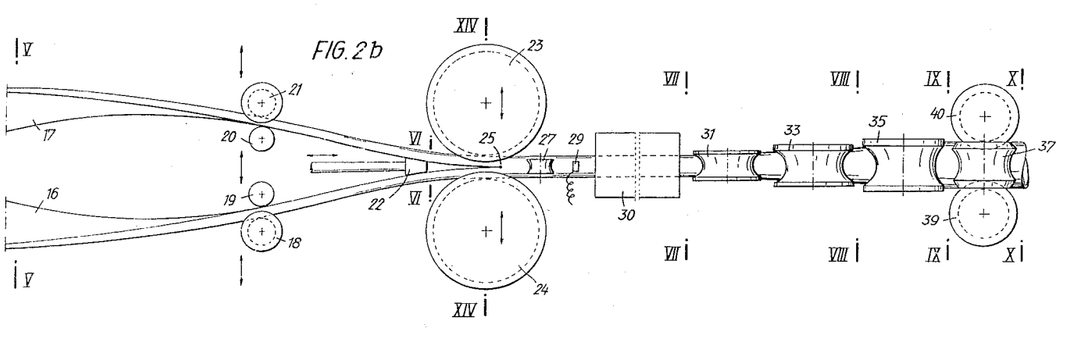
Figure 3:
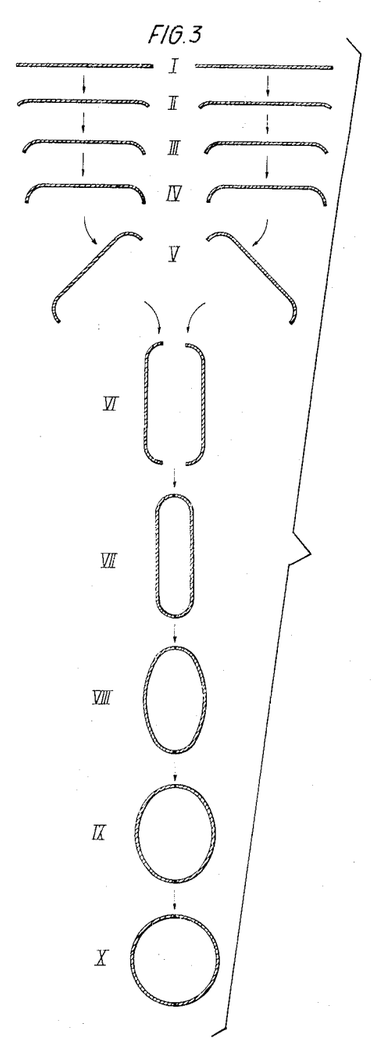
Fig. 3 shows ten cross-sections I to X of the strips, component sections and tube and illustrates progressively the several typical phases of the manufacturing operation.

The several characteristic stages of the manufacture of round tubes according to the invention from two flat strips are apparent from Fig. 3, which shows in section I (corresponding to the line of section I—I of Fig. 2a) the unshaped flat strips, in sections II and III (corresponding to lines of section II—II and III—III of Fig. 2a) intermediate phases of the component sections; in section IV (corresponding to line of section IV—IV of Fig. 2a) the final shape of the component sections; in section V (corresponding to line of section V—V of Fig. 2b) the component sections after they have been twisted towards each other by 45° each; in section VI (corresponding to line of section VI—VI of Fig. 2b) the component sections after they have been twisted through 90° each, shortly before they are welded, in section VII (corresponding to line of section VII—VII of Fig. 2b) the welded tube in flat oval shape; in sections VIII and IX (corresponding to line of section VIII—VIII and IX—IX of Fig. 2b) intermediate phases of the operation of shaping the flat oval tube to the round tube and finally in section X (corresponding to the line of section X—X of Fig. 2b) the finished round tube.

Figure 4:
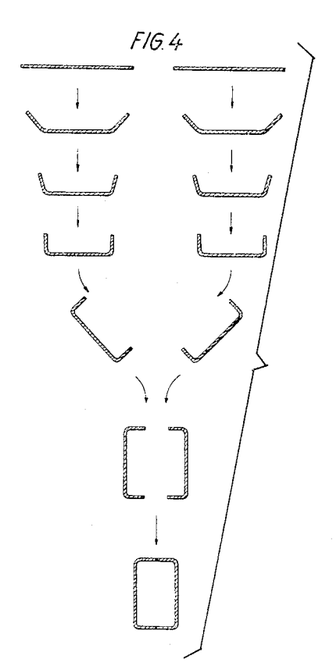
Fig. 4 shows similarly to Fig. 3 seven cross-sections of strips, component sections and a rectangular tube, which represent the typical phases in the manufacture of such rectangular tube.

In the same scheme as in Fig. 3, Fig. 4 shows the several typical phases in the manufacture of rectangular tubes from two flat strips, which are first shaped to form channel sections and are then progressively twisted by 90° and welded.

Figure 5:
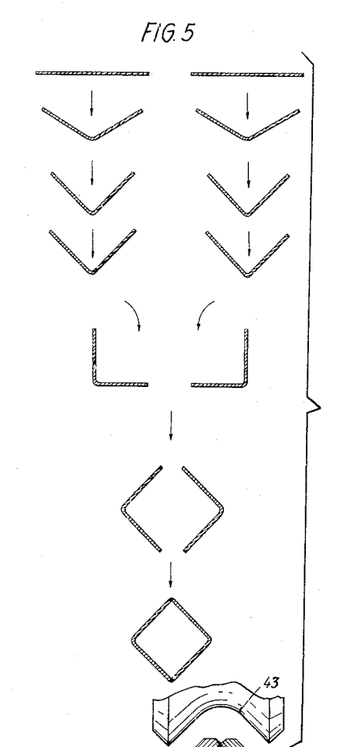
Fig. 5 shows seven cross-sections obtained during the making of a square tube according to the same scheme as in Fig. 4.
Figure 6:
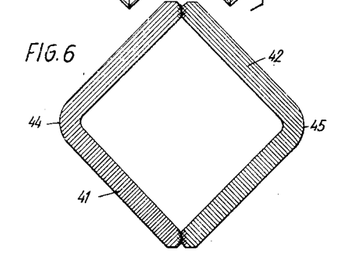
Fig. 6 shows a detail used in the welding of angle-shaped component sections to form a square tube.
Figure 7:
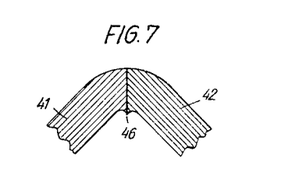
Fig. 7 shows a detail used after the welding of such angle-shaped component sections to form a square tube.

Fig. 5 shows in the same diagrammatical representation the phases of the manufacture of relatively sharp-cornered square tubes from two flat strips, which are shaped to form angle-shaped component sections and are twisted towards each other by 90°. As is apparent from the showing it is necessary to make a corner joint in the manufacture of such relatively sharp-cornered square tubes. The edges of the component profile may be prepared for this joint by chamfering or scraping at any time during their passage through the shaping rolls. Fig. 6 shows to an enlarged scale two angle-shaped component sections, having chamfered edges, directly before they are welded together. The component sections contact each other initially at the surfaces formed by the inner chamfers. During the following welding operation the material which is shown close-hatched is fused along the two welding seams and is displaced by pressure. According to the invention the pressure roller arranged behind the welding station has the profile 43 to give the welded edges of the square tube the same curvatures which have been assumed by the unwelded edges 44 and 45 during the shaping of the component sections. Fig. 7 shows a square tube having edges thus welded, after it has passed the pressure roller. The resulting internal burr 46 may be left or removed.

Figure 8:
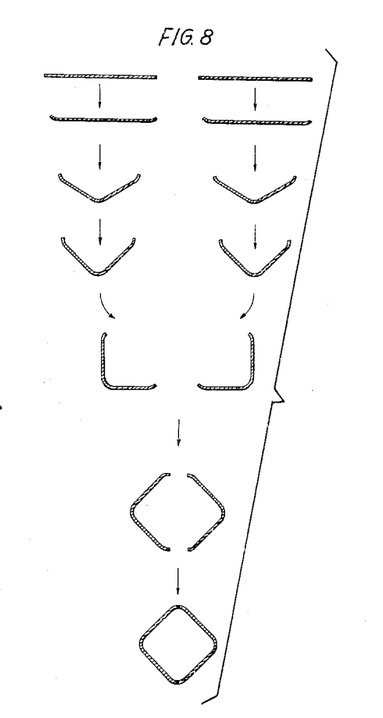
Fig. 8 illustrates seven cross-sections obtained in the manufacture of a square tube according to another embodiment of the invention.

Fig. 8 is a similar view showing the typical phases of the manufacture of a square tube having rounded edges and made from two flat strips, which are shaped to form angle-shaped component sections and twisted by 90° towards each other. In this embodiment the shaping rolls are designed to bend the edges of the component sections so that the edges abut each other after the component sections have been twisted by 90° each. In this case the edges need not be chamfered before they are welded. The tubes made according to this embodiment have edges which are more gently rounded than those made according to the embodiment shown in Figs. 5 to 7.

Figure 9:
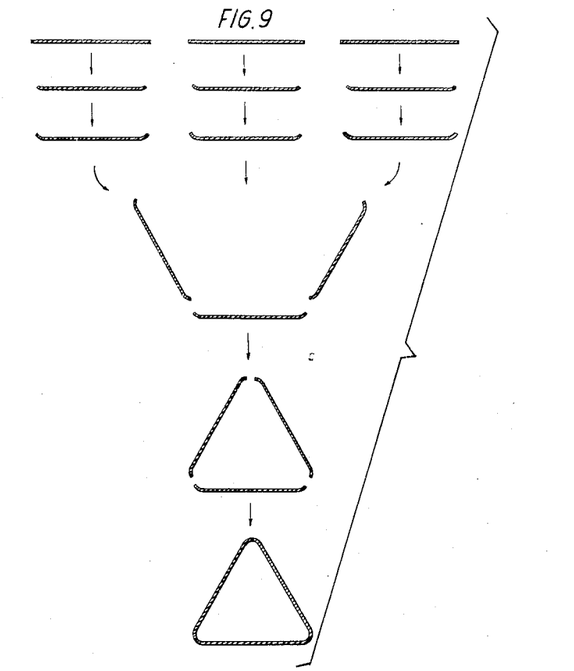
Fig. 9 shows six cross-sections obtained during the manufacture of a triangular tube in the typical phases of the method.

Fig. 9 is a showing which is similar to those shown before and represents the typical phases in the manufacture of a triangular tube having rounded edges and made from three strips, which are initially bent to some extent by the shaping device, which produces three component sections of troughlike cross-section. Then the two outer sections are twisted towards each other by 120° each whereas the intermediate section remains untwisted and the abutting edges are connected by three welding seams.

Figures 10, 12, 13A, 13B:
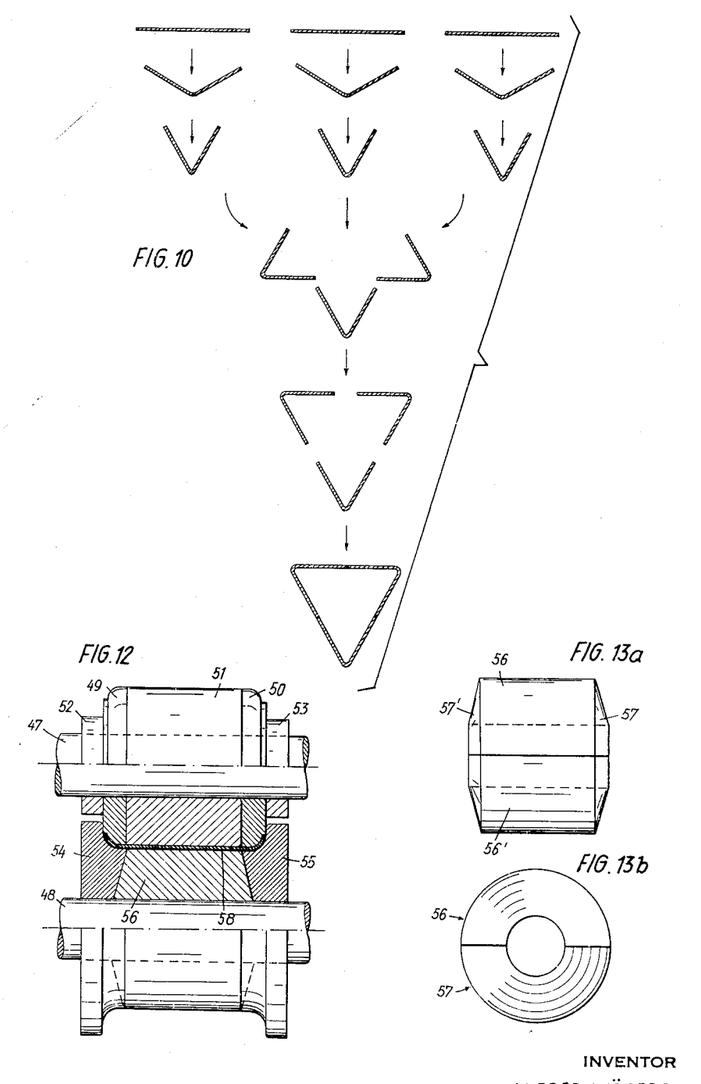

Fig. 10 is a similar showing of the typical phases of the manufacture of a relatively sharp-cornered triangular tube from three strips. As is apparent, three angle-shaped component sections having an angle of opening of 60° are formed first and the two outer component sections are again twisted together by 120° each whereas the intermediate component section remains untwisted. The abutting edges are welded together. Different from the embodiment shown in Fig. 9 the welding seams are disposed approximately in the middle of the faces of the triangular tube rather than at the edges thereof.

Figures 11, 15, 16:
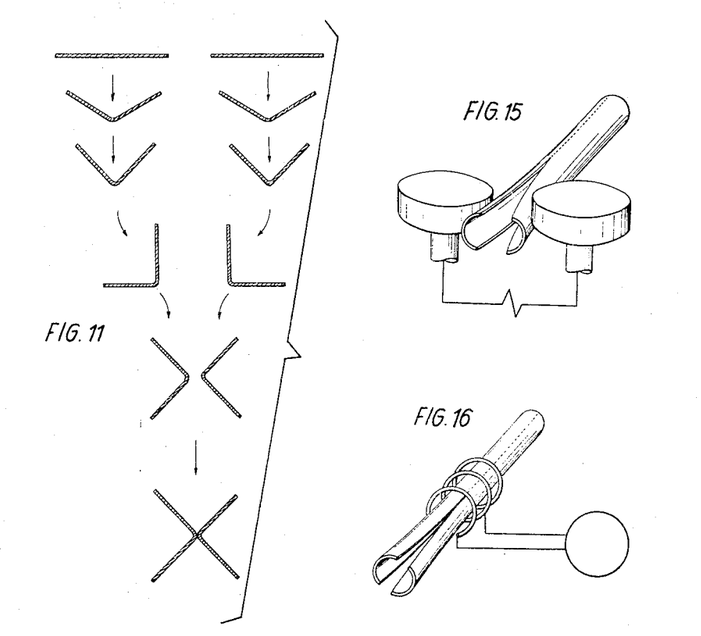
Fig. 11 illustrates six typical cross-sectional views obtained during the manufacture of an open section from two strips.
Figs. 15 and 16 illustrate diagrammatically the principle of preferred welding methods.

Fig. 11 shows another embodiment of the method according to the invention in a similar showing. This embodiment may be used for making open sections. In this example a cruciform section is produced from two flat strips. The strips are first shaped to angle-shaped component-sections and are then twisted by 90° to lie back to back. These edges are welded together by means of a welded seam to form a cruciform section.

Fig. 12 shows a shaping device which may be used to advantage in the method according to the invention. This device serves for the shaping of trough sections for the manufacture of round tubes, with an intermediate phase consisting of a flat oval tube, as is shown in Fig. 3. The device comprises a housing, not shown, in which the upper shaft 47 and the lower shaft 48 are rotatably carried. The punch roll set is affixed to the upper shaft 47. The die roll set is affixed to the lower shaft 48. The punch roll set consists of the working discs 49 and 50, the intermediate roll 51 and the spacer rings 52 and 53. The die roll set consists of the working rolls 54 and 55 and an intermediate roll 56.

As is apparent the working discs 49 and 50 and the working rolls 54 and 55 cooperating therewith have a working surface of quadrant section so that a quadrant section is given to the marginal portions of the strip 58. The cylindrical intermediate rolls 51 and 56 are exchangeable; their length corresponds to the length of the flat intermediate portion between the quadrant-shaped portions of the component section to be made.

In a preferred embodiment the cylindrical intermediate rolls may be made in two parts, as is illustrated in Figs. 13a and 13b for the intermediate roll 56 of the die roll set. The intermediate roll may consist of two half-shells 56 and 56', which are affixed to the shaft 48. The fixing means may consist of bolts or holding pins (not shown). A very desirable fixation is shown in Figs. 12 and 13a, 13b, in which the parts 56 and 56' of the intermediate roll are bevelled at both ends (57 and 57') in the shape of a roof and the working rolls 54 and 55 are also given a corresponding conical shape. As is apparent from Fig. 12, the conical portions of the working rolls 54 and 55 overlap the bevelled rooflike portions of the intermediate roll and hold the two parts 56 and 56' on the shaft 48. This bipartite construction of the intermediate rolls is of great advantage in the exchange of the intermediate roll necessary to vary the diameter of the tube to be made. In that case it is sufficient to loosen the fixing means for the working rolls 54 and 55 and to push the latter apart, then to apply the half-shells of the next intermediate roll to the shaft and to retighten the fixing means for the parts 54 and 55. The working rolls 54 and 55 are never replaced and the portions of the housing which carries the shaft 48 need not to be removed for a change of program.

Like the intermediate roll 56 of the die roll set the cylindrical intermediate roll 51 of the punch roll set may also be of split construction although this is not shown in the drawing. A replacement of the punch rolls 49 and 50 is necessary only when the wall thickness of the tube to be made is to be changed. Otherwise only the intermediate roll 51 is replaced when it is desired to change the tube diameter, as with the die roll set. In any case it must be emphasized that contrary to the known devices only a relatively small inventory of tools is required with this device and the assembly work necessary for a change of program is minimized.

As has already been briefly mentioned a preferred embodiment of the invention comprises steps to ensure a uniform quality of the welding seams formed in the manufacture of the desired section. These steps ensure equal welding temperatures. For instance, if the conductive variant of the electric notch effect welding is used for the making of round tubes according to the scheme shown in Fig. 3 the two welding current rollers are arranged according to the invention in such a manner that their distances from the welding seams may be varied. This is illustrated with reference to an example in Fig. 14. In this case the welding current rollers are arranged to be movable about two axes which are as close as possible to the tube axis.

Figure 14:
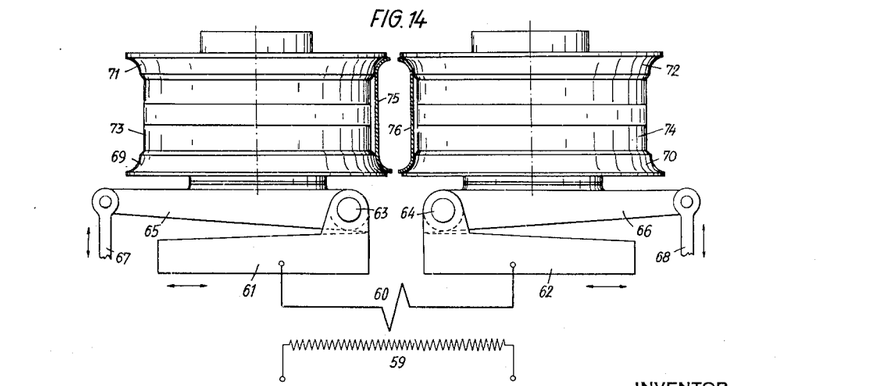
Fig. 14 is a diagrammatic vertical sectional view of the welding device, taken approximately on line XIV—XIV of Fig. 2b.
Figure 17:
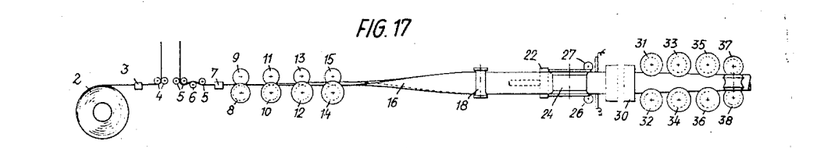
Figs. 17 and 18 show diagrammatic views of the entire plant in elevation and in top plan, respectively.
Figure 18:
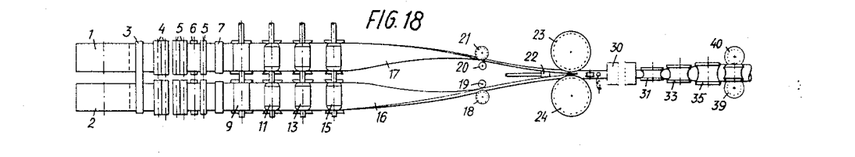

The electric current is supplied to the two slides 61 and 62 from the secondary winding 60 of a transformer having the primary winding 59. The current roller carriers 65 and 66 are pivoted on the pins 63 and 64 and may be pivotally moved by separate means, e.g. the rods 67 and 68, in such a manner that the lower welding current rollers 69 and 70 are moved through smaller distances towards each other than the upper welding current rollers 71 and 72. The welding current may be supplied to the upper rolls either from a second transformer (not shown) or through the intermediate discs 73 and 74. It is supplied to the component sections 75 and 76 at portions close to the seam. If the upper seam proves to be cooler than the lower one the welding current rollers must be swung towards each other. If the lower seam is cooler than the upper one the welding current roller must be swung apart. When both seams are too cool than desired the welding current is to be increased. When the distance of the tip of the welding seam from the welding current rollers is too large the slides 61 and 62 and with them the welding current rollers are to be approached to each other.

The invention affords a number of advantages compared to the conventional processes and apparatus. Because the component sections are accessible from both sides for the tools, such as shaping rolls, and may be completely enclosed by the tools, the invention provides a much greater freedom of choice regarding the tube cross-sections. It permits of a direct production of shapes which had previously to be made by a subsequent drawing operation. The freedom of choice relates also to the relative wall thickness. In addition to the usual tubes it is possible to produce tubes having relatively thin or thick walls. It is also possible to produce tubes having beads, grooves or steps by welding appropriately shaped component sections together. An advantage of the invention which is of great economical importance resides in the fact that the maximum diameter of a round tube which can be made from strip having a given maximum width is doubled. For this reason the maximum diameter of large-size tubes which can be continuously made is increased.

If the welding is performed with the aid of the electrical notch effect the invention provides also a very wide choice regarding the materials. In addition to commercial steels it is possible to use high-strength, heat-resisting and stainless steels as well as aluminium, copper, and alloys thereof.

The invention requires lower plant costs, particularly for plants for making large-size tubes. It involves lower standstill periods, smaller tool costs and lower costs involved in a change of program. For this reason the tubes made according to the invention may be sold at lower cost or with a higher profit.

Thus the invention has a very wide field of application. It is particularly suitable for the making of large pipes of steel or aluminium alloys and for the manufacture of statically stressed square and rectangular tubes, particularly of high-strength steels.

What I claim is:

1. A method for the continuous manufacture of profiles comprising feeding at least two metal strips one beside the other through a shaping zone, shaping the strips in the shaping zone to form trough-like sections having their open sides facing in the same direction and free lateral edges, twisting progressively at least one of the trough-like sections out of its plane of feeding and moving it to a position in which said lateral edges of the trough-like sections abut against each other to provide a tubular member of a desired cross-sectional shape and welding said edges together.

2. A method as set forth in claim 1, in which the metal strips are shaped in stages to form the desired trough-like sections.

3. A method as set forth in claim 1, in which the edges of the trough-like sections are inductively welded together by utilisation of an electrical notch effect.

4. A method as set forth in claim 1, in which the edges of the trough-like sections are conductively welded together by utilisation of an electrical notch effect.

5. A method as set forth in claim 1, in which the tubular member is shaped to a desired final size and shape.

6. A method as set forth in claim 1, in which the metal strips are fed parallel to each other and one beside the other in a common plane and comprising shaping said strips in stages to form said trough-like sections and twisting at least two of said sections towards each other, one in the clockwise sense and the other in the counterclockwise sense, and moving said sections towards each other with at least one edge of each strip engaging an edge of another strip, whereupon the edges engaging each other are welded together.

7. A method for the continuous manufacture of round tubes comprising feeding two metal strips one beside the other through a shaping zone to form two trough-shaped component sections having free lateral edges and which consist, in cross-section, of two quadrant arcs each with an intervening flat portion, twisting said component sections progressively out of their plane of feeding towards each other by 90° each so that the edges of said sections face each other, welding said edges together to form a flat oval tube and shaping the flat oval tube into a round tube.

8. A method for the continuous manufacture of quadrangular tubes comprising feeding two metal strips one beside the other through a shaping zone to form two angle-shaped component sections having their angles facing in the same direction and free lateral edges, twisting said component sections progressively towards each other and moving them to a position in which the edges of the component sections face each other and welding said edges together to form a quadrangular tube.

9. A method as set forth in claim 8, comprising chamfering said edges of the angle-shaped component sections before they are welded.

10. A method as set forth in claim 8, comprising bending the end portions of the flanges of the angle-shaped component sections inwardly to produce a quadrangular tube having rounded edges, said edges being abutted and welded together after the component sections have been twisted.

11. A method for the continuous manufacture of triangular tubes comprising feeding three metal strips parallel to each other and beside each other through a shaping zone to form three component sections having free lateral edges, twisting the two outer component sections progressively towards each other, whereas the intermediate component section remains untwisted, to bring the edges of each section into engagement with the edges of the other two sections and welding the engaging edges of all component sections together to form the triangular tube.

12. Apparatus for the continuous manufacture of profiles from metal strips comprising a plurality of feeding and shaping devices arranged one behind the other to form a shaping train, each of said devices having at least one shaft, at least two shape rolling tools mounted on said shaft one beside the other for shaping at least two metal strips into component sections, means adjacent to said feeding and shaping devices for receiving and twisting at least one of the component sections out of its plane of feeding into a position in which the edges of the component sections face each other, and a welding device for welding together said edges facing each other.

13. Apparatus as set forth in claim 12, in which shaping rolls are provided to form the component sections, the shaping rolls being split in planes extending at right angles to the shaft axis and being adjustable to a selectable width of sections by intermediate rolls split parallel to the shaft axis.

14. Apparatus as set forth in claim 12, in which a distance is provided between the shaping devices and the welding device in order to reduce stresses.

15. Apparatus as set forth in claim 12, in which the welding device is a conductive welding device, which comprises two welding current rollers for the making of each welding seam, the welding rollers being arranged to be pivotally movable about axes which are parallel to the axis of the section so that the distance of the welding current rollers from the welding seams can be varied.

References Cited in the file of this patent

UNITED STATES PATENTS

| | | |
|---|---|---|
| 1,313,025 | Smith | Aug. 12, 1919 |
| 2,009,685 | Caputo | July 30, 1935 |
| 2,136,059 | Sciaky | Nov. 8, 1938 |
| 2,647,981 | Wogerbauer | Aug. 4, 1953 |

FOREIGN PATENTS

| | | |
|---|---|---|
| 110,819 | Sweden | June 6, 1944 |